United States Patent
Yoshida et al.

(10) Patent No.: US 9,081,892 B2
(45) Date of Patent: Jul. 14, 2015

(54) SOFTWARE VERIFICATION

(71) Applicant: FUJITSU LIMITED, Kawasaki-shi, Kanagawa (JP)

(72) Inventors: Hiroaki Yoshida, Cupertino, CA (US); Maarten H. Wiggers, San Jose, CA (US)

(73) Assignee: FUJITSU LIMITED, Kawasaki (JP)

( * ) Notice: Subject to any disclaimer, the term of this patent is extended or adjusted under 35 U.S.C. 154(b) by 145 days.

(21) Appl. No.: 13/828,886

(22) Filed: Mar. 14, 2013

(65) Prior Publication Data
US 2014/0282419 A1  Sep. 18, 2014

(51) Int. Cl.
*G06F 11/36* (2006.01)

(52) U.S. Cl.
CPC .................................. *G06F 11/3604* (2013.01)

(58) Field of Classification Search
CPC ............... G06F 7/78; G06F 8/00–8/78; G06F 9/44–9/455; G06F 11/36
USPC .................................................. 717/100–178
See application file for complete search history.

(56) References Cited

U.S. PATENT DOCUMENTS

| | | | | |
|---|---|---|---|---|
| 5,652,835 | A * | 7/1997 | Miller | 714/38.14 |
| 7,681,180 | B2 | 3/2010 | de Halleux et al. | |
| 8,359,576 | B2 | 1/2013 | Prasad et al. | |
| 2007/0033440 | A1 | 2/2007 | Tillmann et al. | |
| 2007/0033443 | A1 | 2/2007 | Tillmann et al. | |
| 2007/0169015 | A1 * | 7/2007 | Seelig et al. | 717/136 |
| 2009/0089759 | A1 | 4/2009 | Rajan et al. | |
| 2010/0223599 | A1 | 9/2010 | Ghosh et al. | |
| 2010/0242029 | A1 | 9/2010 | Tkachuk et al. | |
| 2011/0154121 | A1 * | 6/2011 | Dern et al. | 714/38.1 |
| 2012/0192150 | A1 | 7/2012 | Li et al. | |
| 2012/0192162 | A1 | 7/2012 | Li et al. | |
| 2012/0192169 | A1 | 7/2012 | Li et al. | |
| 2012/0204154 | A1 | 8/2012 | Li et al. | |
| 2012/0284701 | A1 * | 11/2012 | Tsai et al. | 717/151 |
| 2012/0311545 | A1 | 12/2012 | Li et al. | |
| 2013/0283236 | A1 * | 10/2013 | Kuznetsov et al. | 717/124 |
| 2014/0019939 | A1 * | 1/2014 | Wiggers et al. | 717/124 |

OTHER PUBLICATIONS

Haugh et al., Testing C Programs for Buffer OVerflow Vulnerabilities, 2003.*

Chou, Andy, "False Positives Over Time: A Problem in Deploying Static Analysis Tools", Workshop on the Evaluation of Software Defect Detection Tools, Jun. 12, 2005, <http://www.cs.umd.edu/~pugh/BugWorkshop05/papers/34-chou.pdf>.

(Continued)

*Primary Examiner* — Wei Zhen
*Assistant Examiner* — Zhan Chen
(74) *Attorney, Agent, or Firm* — Maschoff Brennan

(57) ABSTRACT

A method of verifying software includes receiving at least a portion of a software program. The portion of the software program may include a software function within a class. The method may also include generating a proxy class based on the class where the proxy class includes a proxy function that includes a call to the software function and analyzing the proxy function. The analysis of the proxy function may include analyzing the software function based on a proxy condition used by the proxy function, the proxy condition based on the software program and configured to apply conditions to parameters and/or variables in the software function.

14 Claims, 7 Drawing Sheets

(56) References Cited

OTHER PUBLICATIONS

Covertiy Scan, "Tune Your Project", Retrieved Feb. 27, 2013, <http://scan.coverity.com/best-practice.html>.

Tillmann et al., "Parameterized Unit Tests", in Proceedings of the 10th European Software Engineering Conference held jointly with 13th ACM SIGSOFT International Symposium on Foundations of Software Engineering, Association for Computing Machinery, Inc., Sep. 2005, vol. 30, Issue 5, pp. 241-244.

\* cited by examiner

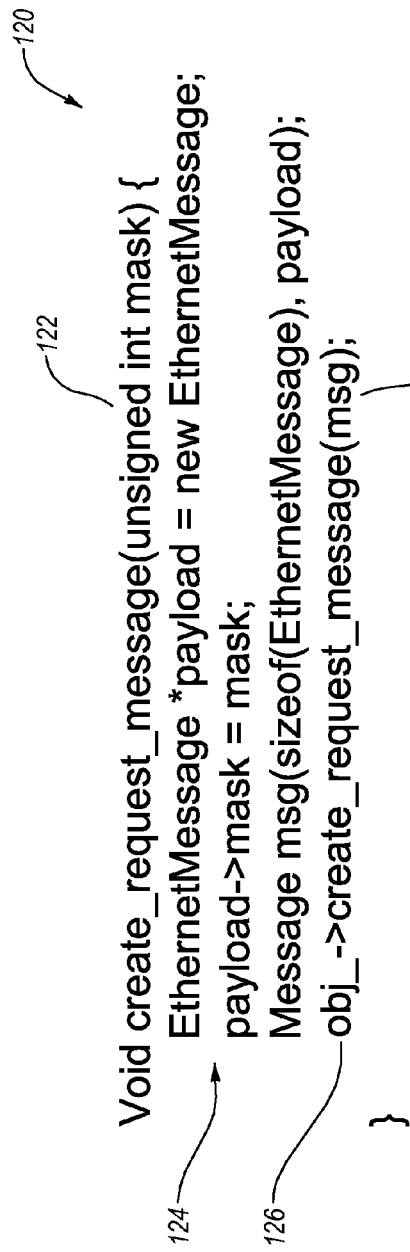
Fig. 1A
Fig. 1B

```
class process {
Public :
    process (int id) {...};
    void func (int var) {...};
}
```

*Fig. 3A*

```
class proxyprocess {
Public :
    proxyprocess (int id){
        ex_object = new process(id);
    }
    void proxy_func (int var1) {
        ex_object -> func(var1);
    }
}
```

*Fig. 3B*

SOFTWARE VERIFICATION

FIELD

The embodiments discussed herein are related to verifying software.

BACKGROUND

As usage of electronic devices increases, so does the number of software programs run on these devices. Typically when a software program is developed, it is verified to help assure that the software program satisfies all of the predetermined requirements for the software program. Developing test cases to determine if a software program satisfies all predetermined requirements may be difficult and time consuming. For example, in the C/C++ language a function within a software program may have a void* argument. A void* argument may be an ambiguous argument because it indicates that the function accepts a pointer to an object of any argument type. When generating test cases to verify a function, a software analysis tool may not be able to determine values that satisfy conditions within branching points of the function when an ambiguous argument is used within the branching points of the function. As a result, proper verification coverage of the function may not be obtained through the test cases generated by the software analysis tool.

One approach used by existing software analysis tools to remedy the problem of ambiguous arguments is to have non-compilable comments manually placed in the software program that indicate instances in the software program that are ambiguous or instances that the software analysis tools may struggle to understand and/or handle. However, such non-compilable comments may result in a less readable software program, may not precisely define the ambiguous arguments, may not be expressive enough for someone not associated with the software analysis tools to understand, and may only be read and understood by a select type of software analysis tool thereby limiting the ability of the software to be verified by other software analysis tools.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a method of verifying software includes receiving at least a portion of a software program. The portion of the software program may include a software function within a class. The method may also include generating a proxy class based on the class where the proxy class includes a proxy function that includes a call to the software function and analyzing the proxy function. The analysis of the proxy function may include analyzing the software function based on a proxy condition used by the proxy function, the proxy condition based on the software program and configured to apply conditions to parameters and/or variables in the software function.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 1A illustrates an example function of a software program;

FIG. 1B illustrates an example proxy function of the function of the software program of FIG. 1A;

FIG. 3A illustrates an example class of a software program;

FIG. 3B illustrates an example proxy class of the class of the software program of FIG. 3A.

DESCRIPTION OF EMBODIMENTS

Figure 2:
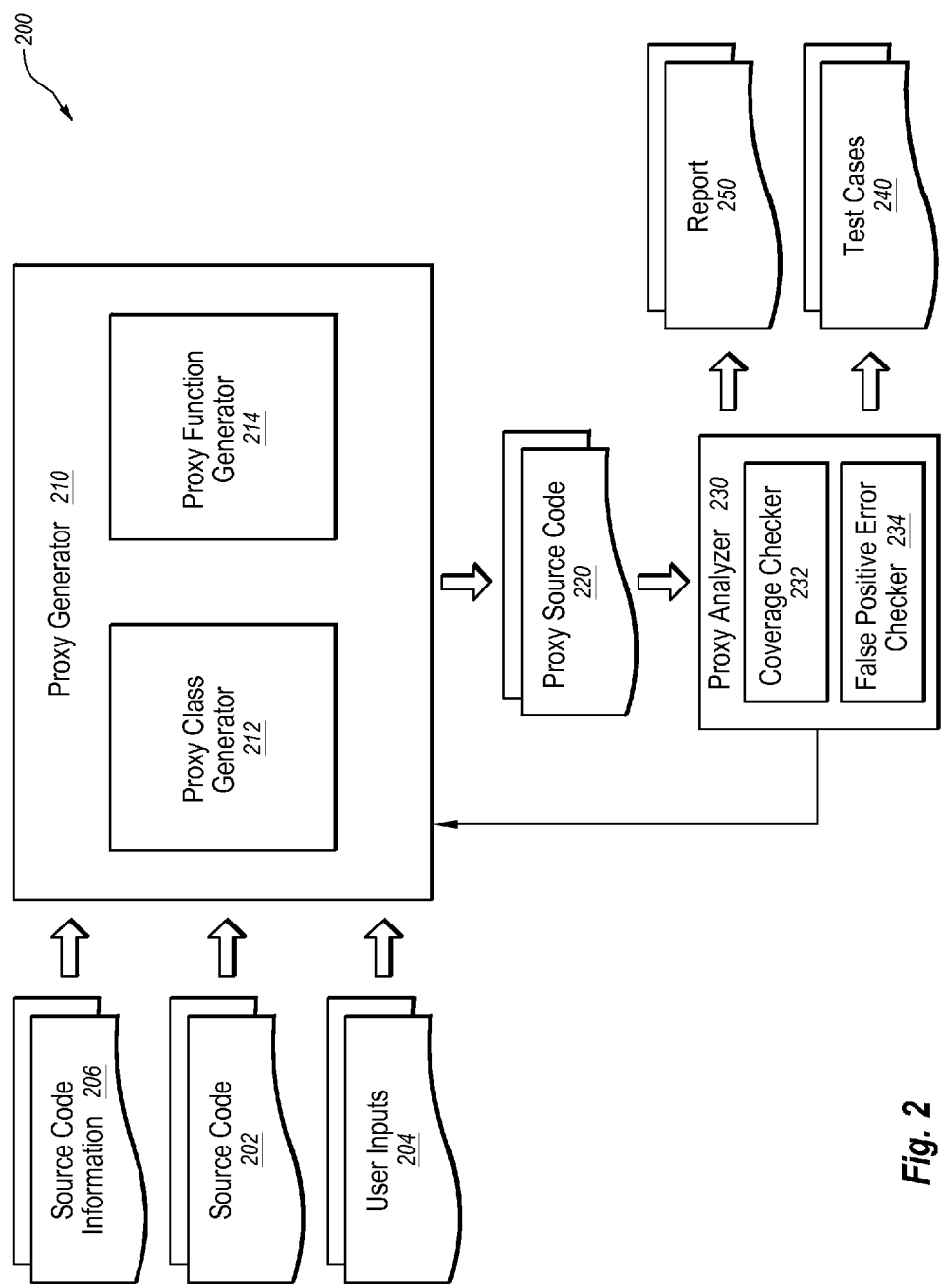
FIG. 2 is a block diagram of an example system of verifying software.

Some embodiments described herein relate to methods and systems of verifying software. The software to be verified may include multiple execution paths. Various functions within various classes may be part of the multiple execution paths. The execution paths may include one or more branching points, such as conditional software statements, and other software statements, such as assignments, function calls, and other software statements. In some embodiments, one or more of the functions may include one or more multiple execution paths.

In some embodiments, to verify the software, the software may be concretely executed using multiple concrete inputs to traverse multiple execution paths of the software. Software analysis may be used to determine concrete inputs that may traverse an adequate number of executions paths of the software to adequately verify the functionality of the software. The various types of software analysis that may be used include static software analysis, dynamic software analysis, and/or symbolic software analysis.

Some software may be written in a form that may make it difficult for software analysis tools to analyze the software. In particular, functions within the software may be written in such a form that a software analysis tool is unable to determine test cases that may traverse an adequate number of execution paths of the software thereby not providing adequate verification coverage of the software. Furthermore, the functions in the software may be written in such a form that a software analysis tool is unable to determine other properties of the software.

In some embodiments, as described herein, the compilable programming language of the software may be used to apply conditions, such as constraints, to parameters or other variables of one or more functions of the software. By applying conditions to the parameters or the other variables, a software analysis tool may be more able to determine test cases that may be used to provide adequate verification coverage of the function of the software. Furthermore, by applying conditions to the parameters or the other variables, a software analysis tool may ascertain properties of the software program and/or reduce false positive errors generated by the software analysis tool.

In some embodiments, the conditions applied to the parameters or the other variables may be applied to a function by generating a proxy function that is a parameterized usage scenario of the function. The proxy function may include a call to the function as well as compilable source code that applies conditions to the parameters or the other variables within the function. In some embodiments, an incremental approach may be used, where the conditions applied to the parameters or the other variables within the function may be varied based on results of the software analysis tool until adequate verification coverage of the software is achieved.

Embodiments of the present invention will be explained with reference to the accompanying drawings.

FIGS. 1A and 1B represent examples of a function 110 and a proxy function 120, respectively, of a software program that are used as examples in explaining the general concepts disclosed herein. As such, the software portions illustrated in FIGS. 1A and 1B are representative of one solution that may be generated based on one or more embodiments disclosed herein. Numerous other solutions and software configurations may be implemented without departing from the scope of the present application.

In particular, FIG. 1A illustrates the example function 110 of the software program, arranged in accordance with at least some embodiments described herein. The software program may contain multiple classes, with each of the classes including one or more functions, among other types of source code. The function 110 may be part of one of the classes of the software program. In FIG. 1, the function 110 is part of a class named "process" and has a parameter 112, Message &msg, which may be an object of the process class that is passed to the function 110 when the function 110 is called in the software program. Within the function 110, at line 114, a variable "message_payload" may be created based on the parameter 112 passed to the function 110. At line 116, the message_payload may be type casted to become an object "payload" of an EthernetMessage class. A "mask" which is a value of a member of payload is evaluated in a conditional statement that, when evaluated as true, allows the remaining portions of the function 110 to be executed.

Based on the undefined types of the message_payload, the type casting, and/or the conditional statement being based on a member of an object of the class that is undefined in the function 110, the function 110 may become somewhat abstract to a software analyzer. As a result, the source code of the function 110 may inhibit a software analyzer from understanding what values may allow the conditional statement to evaluate as true. In particular, the software analyzer may not understand that in the function 110 a value of a member of an object of the type EthernetMessage is to be wrapped in an object of the type Message. As a result, the software analyzer may not be able to determine a test case that may execute portions of the function 110 when the conditional statement evaluates as true. Thus, test cases provided by the software analyzer may not be able to provide adequate verification coverage of the function 110. Furthermore, the software analyzer may be unable to determine other properties of the function 110.

FIG. 1B illustrates the example proxy function 120 of the function 110 of the software program of FIG. 1A, arranged in accordance with at least some embodiments described herein. The proxy function 120 may be a function that is generated based on the function 110 to improve the ability of the software analyzer to understand the function 110 and ascertain one or more properties of the proxy function, such as test cases that provide adequate verification coverage of the function 110 and the software program. To this end, the proxy function 120 may be analyzed by the software analyzer to ascertain one or more properties of the proxy function for the function 110 and the software program.

Along with being based on the function 110, the proxy function 120 may also include one or more conditions that may limit potential execution paths of the function 110. Limiting potential execution paths of the function 110 may include limiting values of variables within the function 110, limiting values of parameters passed to the function 110, adding constructors within the proxy function 120 to define variables within the function 110, among others. The proxy function 120 may also be part of a proxy class that may be generated based on the class that includes the function. The proxy class may include proxy constructors, definitions of proxy objects, and other proxy variables specific to the proxy class.

The proxy function 120, at line 126, includes a call to the function 110. The proxy function 120 also includes various proxy conditions that may be used to apply conditions, such as constraints, to the parameter 112 passed to the function. In particular, the proxy function 120 includes a parameter, unsigned int mask, which is configured to be passed to the proxy function 120. At lines 124, the proxy function 120 is configured to generate a variable, msg, based on the parameter 122 of the proxy function 120 that is passed to the function 110. The proxy conditions in the proxy function 120, for example, the source code at lines 124 and the parameter 122, result in limiting a value that may be assigned to the parameter 112 of the function 110 when it is called within the software program.

By limiting the values assigned to the parameter 112 of the function 110, the proxy function 120 may make the function 110 more definite for a software analyzer. When the function 110 is more definite for a software analyzer, the software analyzer may be able to determine one or more properties of the function 110. In some embodiments, one or more properties of the function 110 may include test cases that provide adequate verification coverage of the function 110. In particular, the proxy function 120 is configured so that the software analyzer understands that an integer value is provided to the conditional statement in line 118 of the function 110. As a result, the software analyzer is able to determine an integer value that satisfies the conditional statement in line 118 and analyze the remaining portions of the function 110. By being able to analyze the function 110 in its entirety, the software analyzer may generate a test case that may allow for the source code after the conditional statement to be executed and verified.

The function 110 provides an example of one configuration of source code that may present one or more problems to a software analyzer. Various other configurations of source code may present problems to a software analyzer. For example, source code that includes user-defined types, such as class types; global variables; static variables; class fields; cast typing; among other configurations of source code may result in a software analyzer not being able to determine one or more properties of the function 110 or being able to generate test cases that provide adequate verification coverage. Other types of source code configurations may also result in a software analyzer not being able to determine one or more properties of a function or being able to generate test cases that provide adequate verification coverage.

Another example of source code that may present one or more problems to a software analyzer may be conditions within functions that appear to be errors but are not errors, referred to herein as false positive errors. For example, a pointer used in a function that is not initialized in the function but initialized in the software program before the function is called may be identified as a false positive error. A proxy function of a function may add conditions to the function so that conditions in the function are not considered errors when the function is analyzed. For example, a proxy function of the function may initialize the pointer with respect to the function so that the analysis of the function does not indicate the non-initialization of the pointer in the function as being an error.

Alternately or additionally, how the software analyzer is analyzing the software may present different problems. For example, static variables in a static analysis of a software program may allow for adequate properties of a function to be determined, whereas static variables in a symbolic analysis of the software program may not allow for adequate properties of the function to be determined. Alternately or additionally, the source code may have such a large scope because one or more variables or functions are not assigned known or particular types that the software analyzer is forced to analyze so many different possibilities that no properties of the function may be determined before the software analyzer times out or uses all available processing resources.

The proxy function 120 provides an example proxy function that may be used by a program analyzer to determine properties of the function 110. Other configurations of the proxy function 120 may be used to determine properties of the function 110, such as test cases that may provide adequate verification coverage of the function 110.

FIG. 2 is a block diagram of an example system 200 for verifying software, arranged in accordance with at least some embodiments described herein. The system 200 may be configured to generate proxy source code 220 based on source code 202 and to generate test cases 240 and a report 250 by analyzing the proxy source code 220.

The system 200 includes a proxy generator 210 and a proxy analyzer 230. The proxy generator 210 includes a proxy class generator 212 and a proxy function generator 214. The proxy generator 210 is configured to receive inputs, such as the source code 202, user inputs 204, and source code information 206. Based on one or more of these received inputs, the proxy generator 210 is configured to generate the proxy source code 220.

In particular, the proxy class generator 212 may be configured to receive the source code 202 and to determine different classes within the source code 202. For each class in the source code 202, the proxy class generator 212 may be configured to generate a proxy class. For a given class in the source code 202, its corresponding proxy class may be an abstraction of the given class that provides a layer between the proxy analyzer 230 and the source code 202. The abstraction may allow a generated proxy class to apply particular conditions to the source code 202 so that the proxy analyzer 230 may focus on particular variables or parameters or limited scopes of variables or parameters so that the proxy analyzer 230 may more readily obtain one or more properties of the proxy function and/or eliminate false positive errors.

In some embodiments, the proxy class generator 212 may be configured to generate source code of the proxy class. The proxy class source code may include a constructor configured to generate a class object of the class associated with the proxy class. The proxy class generator 212 may also be configured to generate proxy functions for each of the functions within the class associated with the proxy class. Each proxy function may include parameters similar to parameters of the function associated with the proxy function. Alternately or additionally, the proxy functions may include a call to the function associated with the proxy function.

FIG. 3A illustrates an example class 300 of a software program and FIG. 3B illustrates an example proxy class 320 of the class of the software program of FIG. 3A. The class 300 is named process and includes a constructor and a function func with a parameter var of type int. The proxy class 320 is an example of a proxy class that may be generated based on the class 300. For example, the proxy class 320 may be generated using the proxy class generator 212 of FIG. 2.

The proxy class 320 is named proxyprocess and includes a constructor that generates a class object of the process class named ex_object. The proxyprocess class further includes a proxy function named proxy_func with a parameter var1. The function proxy_func includes a call to the function func of the process class where the parameter var1 from the proxy_func is passed as a parameter to the function func of the process class.

The class 300 and proxy class 320 illustrate one example of a proxy class that may be generated based on a class as described herein. Other methods and source code configurations may be used to generate a proxy class from a class without deviating from the scope of the present application.

Returning to FIG. 2, in some embodiments, after the proxy class is generated, the proxy class is appended to the source code 202 to generate the proxy source code 220 that is sent to the proxy analyzer 230. In some embodiments, all of the proxy functions in a proxy class may be contained in a single source file that may be sent to the proxy analyzer 230.

In some embodiments, after the proxy class is generated, the proxy function generator 214 may be configured to further refine one or more of the proxy functions within the proxy class. The proxy function generator 214 may refine a proxy function by including one or more conditions within the proxy function that may limit potential execution paths of the function, allow for additional properties of the function to be determines, and/or eliminate false positive errors of the functions. In some embodiments, including one or more conditions within a proxy function may limit variables and/or parameters and/or a scope of the variables and/or parameters analyzed by the proxy analyzer 230.

In some embodiments, the proxy function generator 214 may refine a proxy function of a function based on the source code information 206. The source code information 206 may include information about variables that determine a control flow through the function. For example, the control flow variables may be variables that are associated with branching points, used in evaluating conditional statements, among other variables that determine the flow through the different execution paths within the function. The proxy function generator 214 may be configured to refine the proxy function to include one or more of the control flow variables as a parameter in the proxy function.

The source code information 206 may further include information about an exact call scenario of a function within the source code 202. Exact call scenario information may include the values of variables that are used with the function when the source code 202 is executed successfully. The proxy function generator 214 may be configured to refine the proxy function to include one or more of the variables and the values for the variables based on the exact call scenario information within the body of the proxy function 214. Alternately or additionally, the proxy function generator 214 may be configured to refine the proxy function to include a call to a constructor that adjusts one or more variables of the class and the proxy class.

In some embodiments, the source code information 206 may further include information about a false positive errors identified in the source code 202. The information about the false positive errors may be conditions that may reduce or eliminate the false positive errors identified in the source code 202. In these and other embodiments, the proxy function 214 may be configured to refine the proxy function to include the conditions to prevent the false positive errors.

In some embodiments, the proxy function generator 214 may be further configured to refine a proxy function based on the user inputs 204. In these and other embodiments, a user may interact with the proxy function generator 214 and perform source code edits to the proxy function. In these and other embodiments, a user may refine the parameters of the proxy function and/or the body of the proxy function.

After the proxy function generator 214 has refined the proxy function, the proxy class with the refined proxy function is appended to the source code 202 to generate the proxy source code 220 that is sent to the proxy analyzer 230.

In some embodiments, the proxy analyzer 230 may be configured to analyze the proxy source code 220 to ascertain properties of the source code 202. Properties of the source code 202 that may be ascertained may include test cases, known defects, out-of-bounds memory accesses, uninitialized pointers, divide by zero, memory leaks, such as when memory is allocated but never de-allocated. In some embodiments, the proxy analyzer 230 may be analogous to a software or source code analyzer. Various different source code analysis techniques may be implemented by the proxy analyzer 230. For example, the proxy analyzer 230 may employ dynamic analysis, static analysis, or symbolic analysis to the proxy source code to ascertain properties of the source code 202.

By analyzing the proxy source code 220 instead of the source code 202, the proxy analyzer 230 may be able to focus its analysis on certain variables and/or parameters or certain values of variables and/or parameters within the source code 202 thereby increasing the likelihood of being able to ascertain certain properties of the source code 202, such as errors in the source code 202. In some embodiments, the proxy analyzer 230 may be configured to generate a report 250 that indicates the properties, such as errors within the source code 202.

Furthermore, by analyzing the proxy source code 220 instead of the source code 202, the proxy analyzer 230 may increase the likelihood of being able to eliminate false positive errors of the source code 202. For example, the proxy analyzer 230 may include a false positive error checker 234 that may be configured to check errors whether errors identified by the proxy analyzer 230 are false positive errors. The false positive error checker 234 may use the source code 202 along with other information, such as the user inputs 204, and/or the source code information 206 to determine when an error in a function as reported by the proxy analyzer 230 is a false positive error. Alternately or additionally, the false positive error checker 234 may indicate to the proxy generator 210 when a false positive error has occurred. The proxy function generator 214 may be configured to further refine one or more proxy functions in the proxy source code 220 to include conditions to reduce or eliminate the false positive errors in the source code 202. In these and other embodiments, the report 250 may include or not include the false positive errors.

As another example, in some embodiments, through the analysis of the proxy source code 220, the proxy analyzer 230 may generate test cases 240 that provide adequate verification coverage of the source code 202. Alternately or additionally, by analyzing the proxy source code 220 instead of the source code 202, the proxy analyzer 230 may be able to focus the analysis on certain execution paths within the source code 202 thereby increasing the likelihood of being able to generate test cases 240 that provide adequate verification coverage of the source code 202.

The proxy analyzer 230 may include a coverage checker 232. The coverage checker 232 may be configured to review the test cases 240 and/or the analysis of the proxy analyzer 230 to determine how much of the scope of the source code 202 is analyzed by the proxy analyzer 230 or covered by the test cases 240. For example, the coverage checker 232 may determine the number of lines of the source code 202 analyzed by the proxy analyzer 230 and compare the number of analyzed lines to the total number of lines of the source code 202. When the number of analyzed lines as compared to the total number of lines of the source code 202 is below a particular threshold, the coverage checker 232 may determine that the source code 202 was not adequately analyzed and thus that the test cases 240 may not provide adequate verification coverage.

In some embodiments, the coverage checker 232 may check when a known error has been identified in the proxy source code 220 by the proxy analyzer. A known error may be an error that is identified in the source code 202 by a system that is not the system 200. If the known error is not identified, the coverage of the proxy source code 220 may be inadequate. In these and other embodiments, such as when the proxy analyzer 230 is not able to generate test cases 240 based on the proxy source code 220, for example when the proxy analyzer 230 times out or runs out of computing resources, the coverage checker 232 may indicate to the proxy generator 210, and in particular the proxy function generator 214, that the analysis coverage of the source code 202 is inadequate.

When the proxy function generator 214 receives an indication that the analysis coverage of the source code 202 is inadequate, the proxy function generator 214 may be configured to further refine one or more proxy functions in the proxy source code 220. When further refining a proxy function, the proxy function generator 214 may be configured to constrain or generalize the proxy function.

For example, when the coverage checker 232 indicates that the proxy analyzer 230 was unable to generate test cases or that the proxy analyzer 230 was only able to analyze a limited amount of the proxy source code due to the proxy analyzer 230 not being able to understand or handle the proxy source code 220, the proxy function generator 214 may constrain one or more proxy functions within the proxy source code 220. To further constrain a proxy function, the proxy function generator 214 may refine the proxy function to include an additional condition or further limit a condition already used by the proxy function. For example, the proxy function generator 214 may be configured to add a constructor call along with parameters of the constructor call to parameters of a function, remove a parameter from a function and include a variable in the function that is the same type as the removed parameter, and/or further constrain a variable in the function.

The proxy function generator 214 may determine the conditions to further constrain the proxy function based on the user inputs 204 and/or the source code information 206. In some embodiments, the proxy function generator 214 may determine the conditions to add by analyzing the lines of the source code 202 that were not analyzed by the proxy analyzer 230. For example, for a variable in the proxy function, the proxy function generator 214 may analyze the lines of the source code that were not analyzed to determine a value or range(s) of values that may be used for the variable to further constrain the variable and apply that condition to the proxy function to further constrain the function.

In some embodiments, the proxy function generator 214 may generalize one or more proxy functions within the proxy source code 220. The proxy function generator 214 may generalize one or more proxy functions when the proxy analyzer 230 did not analyze portions of the source code 202 based on the conditions in the proxy source code 220 that should be at least partially analyzed. To generalize a proxy function, the proxy function generator 214 may be configured to add a parameter to the proxy function, remove a variable from the body of the proxy function, adjust a value of variable in the body of the proxy function, remove a call to a constructor in the body of the proxy function, among other things. The proxy function generator 214 may determine how to generalize a proxy function based on the source code information 206, the user inputs 204, or in a manner analogous to how the proxy function generator 214 determines to constrain the proxy function.

In some embodiments, the proxy function generator 214 may generalize one proxy function within a class and constrain another proxy function within the class. Which proxy functions the proxy function generator 214 constrains or generalizes or how the proxy function generator 214 constrains or generalizes proxy functions are not limited to those examples discussed herein.

After further refining one or more proxy functions, the proxy class with the further refined one or more proxy functions is appended to the source code 202 to generate the proxy source code 220 that is again sent to the proxy analyzer 230 for analysis as described herein.

By generating the proxy source code 220 that is analyzed by the proxy analyzer 230, the system 200 may be able to generate test cases that provide adequate verification coverage using the programming language of the source code 202. Additionally, by generating the proxy source code 220 that is analyzed by the proxy analyzer 230, the system 200 may be able to reduce or eliminate false positives. Furthermore, by generating the proxy source code 220 using the programming language of the source code 202, other software analysis tools besides the proxy analyzer 230 may be able to generate tests cases using the proxy source code 220. Alternately or additionally, the conditions applied to the source code 202 by the proxy source code 220 may be readily understood as compared to in-line non-compilable comments that may be applied to the source code 202 to achieve similar results.

Modifications, additions, or omissions may be made to the system 200 without departing from the scope of the present disclosure. For example, the system 200 may be configured to not receive the source code information 206. Alternately or additionally, the system 200 may be configured to report a status of the coverage checker 232 to a user. In these and other embodiments, the user may be able to adjust the threshold of the coverage checker 232.

Figure 4:
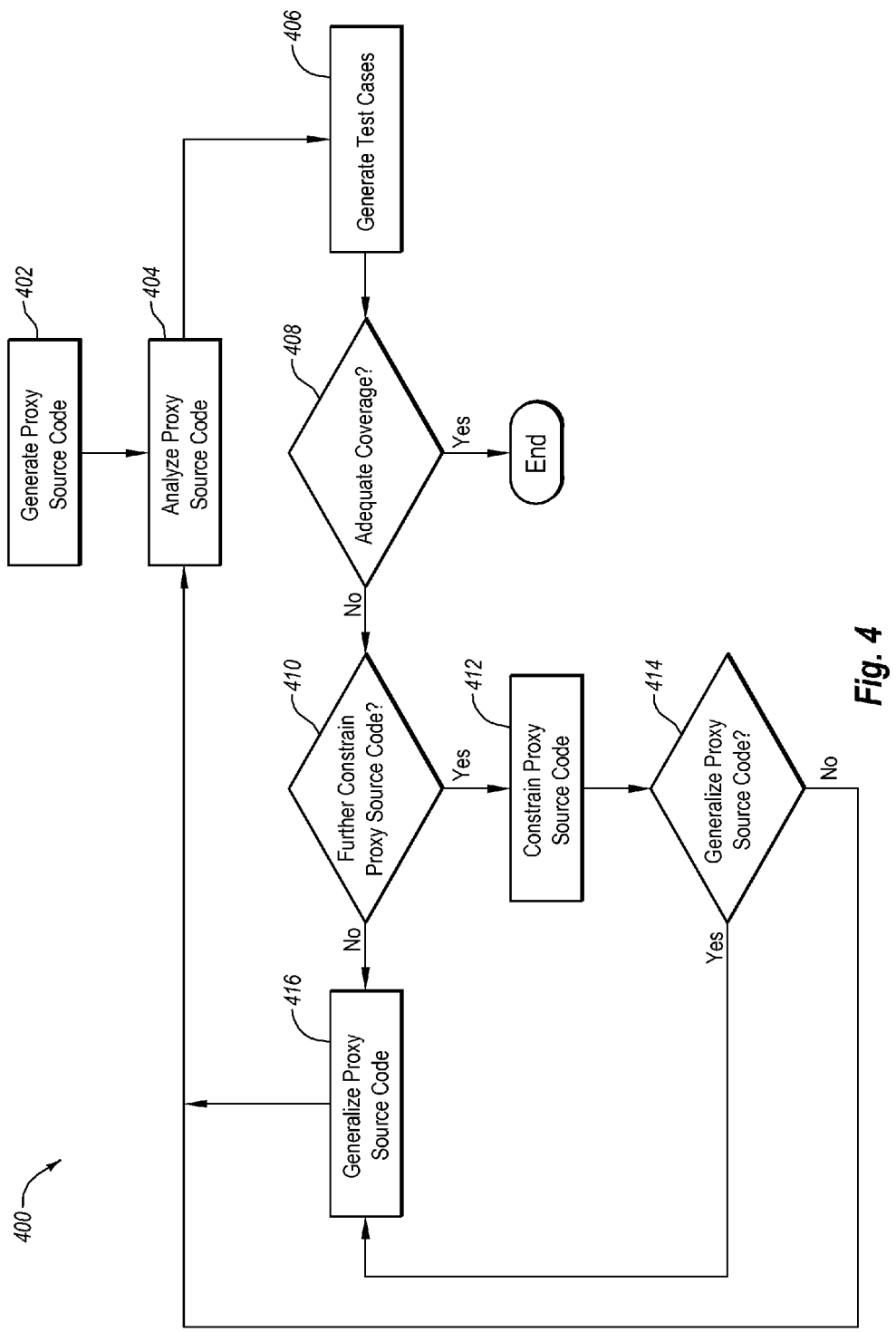
FIGS. 4-7 are flow charts of example methods of verifying software.

FIG. 4 is a flow chart of an example method 400 of verifying software, arranged in accordance with at least some embodiments described herein. The method 400 may be implemented, in some embodiments, by a verifying system, such as the system 200 for verifying software of FIG. 2. Although illustrated as discrete blocks, various blocks may be divided into additional blocks, combined into fewer blocks, or eliminated, depending on the desired implementation.

The method 400 may begin at block 402, where proxy source code may be generated. The proxy source code may be generated based on source code of a program for which test cases may be generated. Generating the proxy source code may include generating a proxy class for each class within the source code and generating a proxy function for one or more functions within each of the classes. In some embodiments, one or more of the proxy functions may be refined to include one or more conditions that may limit potential execution paths of the source code. The one or more proxy functions may be refined based on user inputs, source code information, or on some other aspects. For example, in some embodiments, the proxy function may be refined to include as parameters one or more variables that control the flow of the function. As another example, the proxy function may be refined to include variables in the body of the proxy function that are assigned values associated with values used during a concrete execution of the function. In some embodiments, the proxy functions may not be refined.

In block 404, the proxy source code may be analyzed. Various different source code analysis techniques may be implemented, such as dynamic analysis, static analysis, or symbolic analysis. The proxy source code may be analyzed to determine test cases that may be used to verify functionality of the source code.

In block 406, source code tests may be generated. The source code test may be generated based on the analysis of the proxy source code and may include concrete variables that may be used to execute the source code to allow for validation of the source code. After generating the source code tests, the coverage of the source code tests may be determined. The coverage of the source code tests may include the number of lines of the source code or the proxy source code executed through use of the source code tests.

In block 408, it may be determined if the coverage of the source code tests is adequate. The adequacy of the coverage of the source code tests may depend on one or more variables. In some embodiments, the adequacy of the coverage may depend on a user input or on a previously defined amount of coverage. When the coverage of the proxy source code is adequate, the method 400 may end. When the coverage of the proxy source code is not adequate, the method 400 may proceed to block 410.

In block 410, it may be determined if the proxy source code is to be constrained. The proxy source code may be constrained when the coverage of the proxy source code is inadequate. For example, the coverage may be considered inadequate when a certain percentage of the source code is unanalyzed or certain portions of the source code are unanalyzed. In some embodiments, the analysis of the proxy source code may be inadequate when the analysis is incomplete. For example, in some embodiments, the software analyzer may be unable to analyze all the software because the software analyzer times out because of the complexity of the analysis or the software analyzer runs out of processing resources before finishing the analysis.

When the proxy source code is to be constrained, the method 400 may proceed to block 412. When the proxy source code is not to be constrained, the method 400 may proceed to block 416.

In block 412, the proxy source code may be constrained. Constraining the source code may include constraining a parameter of one or more proxy functions. The parameter of a proxy function may be constrained by removing the parameter from the proxy function and placing a variable associated with the parameter in the body of the proxy function. Alternately or additionally, the parameter of a proxy function may be constrained by including source code in the body of the proxy function that constrains the parameter. When the parameter is a type built-in to the programming language of the source code, for example, an int, char, float, among others, the parameter may be constrained by limiting values that may be associated with the parameter in the body of the proxy function. When a parameter is constrained to a single value in the body of the proxy function, the parameter may be removed. When the parameter is a type that is not built-in to the programming language of the source code, for example, a member of a class, a constructor may be added to the body of the proxy condition and the parameter may be removed from the proxy function. Other ways may be used to constrain a proxy function than those discussed herein.

In block 414, it may be determined if the proxy source code is to be generalized. The proxy source code may be generalized when the coverage of the proxy source code is inadequate. For example, the coverage may be considered inadequate when a certain percentage of the source code is unable to be analyzed or certain portions of the source code are unable to be analyzed because the proxy source code has so limited the analysis to exclude these portions of the source code. In essence, the proxy source code has over-limited the analysis of the source code so that the analysis of the source code is too narrow.

When the proxy source code is to be generalized, the method 400 may proceed to block 416. When the proxy source code is to not to be generalized, the method 400 may proceed back to block 404 where the constrained proxy source code may be analyzed and the method 400 may continue.

In block 416, the proxy source may be generalized by generalizing proxy functions. A proxy function may be generalized by selecting a variable in the proxy function and adding a parameter to the proxy function that is the same type as the variable in the proxy function. The body of the proxy function may be refined so that a value of the parameter may be assigned to a variable in the proxy function body.

Block 416 may be followed by block 404 where the generalized and/or constrained source code may be analyzed and the method 400 may continue.

The method 400 allows for incrementally changing the proxy source code to adjust the scope of the source code to be analyzed. In this manner, selected portions of the source code may be analyzed while leaving unanalyzed other portions of the source code. Additionally, a selected scope of the source code may be analyzed without analyzing the entire scope of the source code. The ability to analyze selected portions or scopes of the source code may be advantageous as it may reduce a time for analysis and use less computing resources. In particular, the ability to analyze selected portions or scopes of the source code may be advantageous when performing symbolic analysis. Symbolic analysis includes substituting variables in source code with symbolic variables and performing the appropriate analysis. Symbolic analysis may be more thorough than other software analysis techniques, but more time consuming and inoperable on some types of source code. For example, when source code is large or does not have a well-defined scope, such as when variables do not have defined types, symbolic analysis may be inoperable. The ability to narrow the scope of source code by adding to the source code in a compilable language allows the source code to be analyzed or more easily analyzed using symbolic analysis.

One skilled in the art will appreciate that, for this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

An example of the method 400 follows. In block 402, proxy source code that includes a proxy function may be generated. The following pseudo-code may represent the proxy function:

```
Void create_request_message(Message & p0) {
    obj_->create_request_message(p0);
}
```

In block 404, the proxy source code may be analyzed and in block 406, coverage of the proxy source code may be found to be inadequate. In block 410, it may be determined to constrain the proxy source code. In block 412, the proxy source code may be constrained by constraining the proxy function. In particular, the proxy function may be constrained by adding a constructor that constrains the parameter p0. The following pseudo-code may represent the proxy test function after being constrained:

```
Void create_request_message(EthernetMessage* p0) {
    Message msg(sizeof(EthernetMessage),p0);
    obj_->create_request_message(msg);
}
```

In block 414, it may be decided to not generalize the proxy source code. In block 404, the proxy source code may be analyzed and in block 406, coverage of the proxy source code may be found to be inadequate. In block 410, it may be determined to constrain the proxy source code. In block 412, the proxy source code may be constrained by constraining the proxy function. In particular, the proxy function may be constrained by adding a variable payload. The following pseudo-code may represent the proxy test function after being constrained:

```
Void create_request_message( ) {
    EthernetMessage* payload = new EthernetMessage;
    Message msg(sizeof(EthernetMessage),payload);
    obj_->create_request_message(msg);
}
```

In block 414, it may be decided to not generalize the proxy source code. In block 404, the proxy source code may be analyzed and in block 406, coverage of the proxy source code may be found to be inadequate. In block 410, it may be determined to not constrain the proxy source code. In block 416, the proxy source code may be generalized by generalizing the proxy function. In particular, the proxy function may be generalized by adding a parameter, unsigned int mask, to the proxy function and assigning the parameter to a variable in the body of the proxy function. The following pseudo-code may represent the proxy test function after the generalization:

```
Void create_request_message(unsigned int mask) {
    EthernetMessage *payload = new EthernetMessage;
    payload->mask = mask;
    Message msg(sizeof(EthernetMessage), payload);
    obj_->create_request_message(msg);
}
```

In block 404, the proxy source code may be analyzed and in block 406, coverage of the proxy source code may be found to be adequate. In block 408, source code tests may be generated to test the proxy source code.

Figure 5:
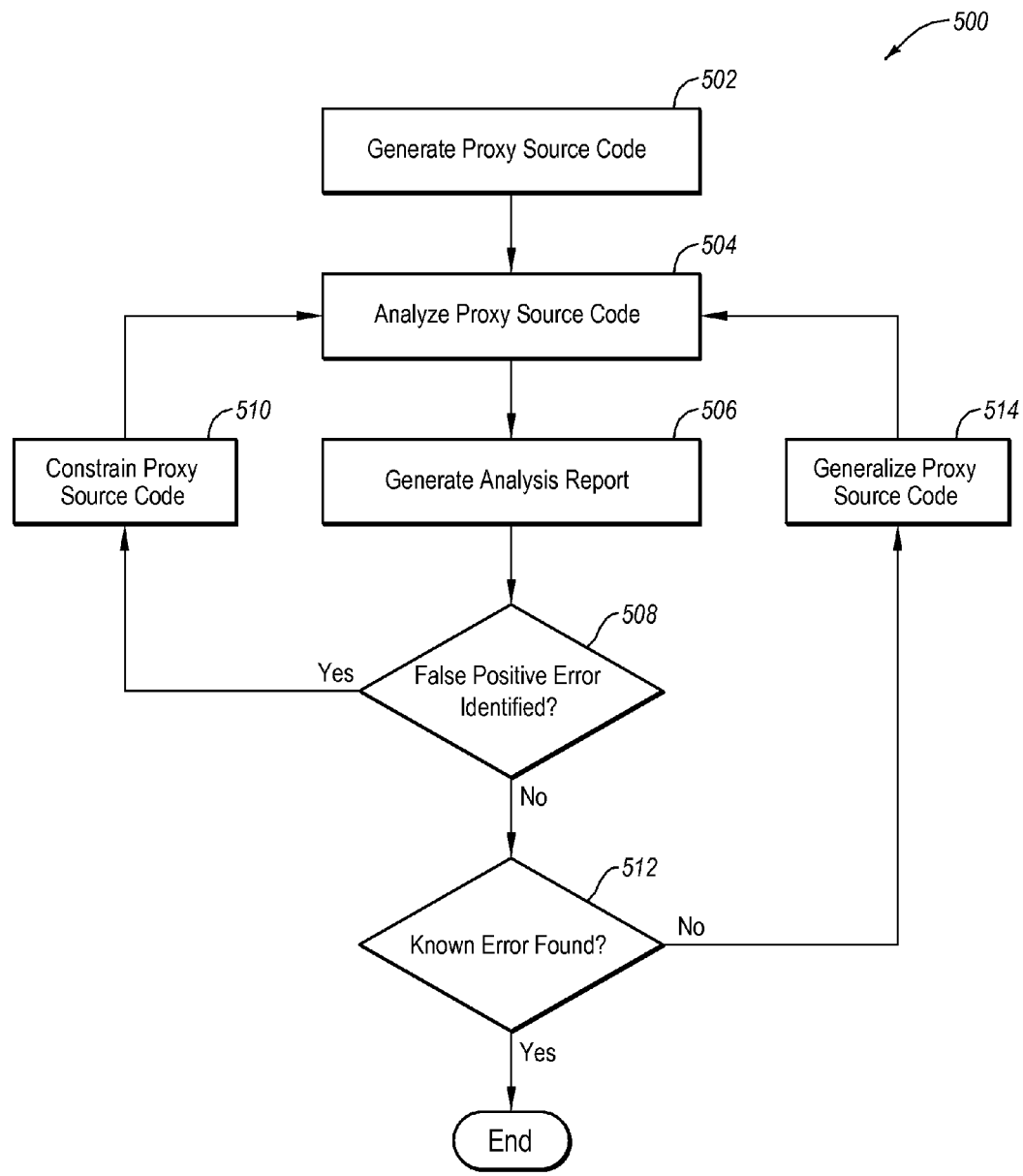

FIG. 5 is a flow chart of an example method 500 of verifying software, arranged in accordance with at least some embodiments described herein. The method 500 may be implemented, in some embodiments, by a verifying system, such as the system 200 of verifying software of FIG. 2. Although illustrated as discrete blocks, various blocks may be divided into additional blocks, combined into fewer blocks, or eliminated, depending on the desired implementation.

The method 500 may begin at block 502, where proxy source code may be generated. The proxy source code may be generated based on source code of a software program. Generating the proxy source code may include generating a proxy class for each class within the source code and generating a proxy function for one or more functions within each of the classes. In some embodiments, one or more of the proxy functions may be refined to include one or more proxy conditions. The one or more proxy functions may be refined based on user inputs, source code information, or based on some other things. For example, in some embodiments, a proxy function based on a function may be refined to include conditions from the software program that affect a determination of errors determined in the function.

In block 504, the proxy source code may be analyzed. In particular, each of the proxy functions may be analyzed individually, which may include the analysis of a function called within and associated with each proxy function. Various different source code analysis techniques may be implemented, such as dynamic analysis, static analysis, or symbolic analysis to analyze the proxy source code.

In block 506, an analysis report may be generated regarding the analysis of the proxy source code. The analysis report may include properties of the proxy source code and/or the source code upon which the proxy source code is based. The properties may include errors within the proxy source code. In particular, the analysis report may indicate errors associated with individual proxy functions in the proxy source code, such as errors in individual functions.

In some embodiments, the errors within the individual functions may be determined to be false positive errors. False positives errors, as discussed previously, may be errors that appear to be errors when a function is analyzed. However, the false positive errors, in the context of the entire source code and not just an individual function within the source code may not be errors. A secondary analysis may be performed based on the source code to identify the false positive errors.

In block 508, it may be determined if a false positive error has been identified. When a false positive has been identified, the method 500 may proceed to block 510. When a false positive has not been identified, the method 500 may proceed to block 512.

In block 510, the proxy source code may be constrained. Constraining the proxy source code may include refining a proxy function that includes a false positive error to include one or more conditions that eliminate the false positive error. The conditions that may eliminate the identified false positive error may have been identified within the proxy source code when determining that an error is a false positive error. The conditions may be added to proxy function where the false positive was located to eliminate the false positive error.

In block 512, it may be determined if a known error has been found. Known errors may be associated with errors that are identified in source code by a method other than the analysis of the proxy source code in block 504. For example, known errors may be determined during other testing of the source code or during use of the source code. The known errors may be compared with the errors found in the analysis report. When a known error matches an error in the analysis report, the known error may have been found by the analysis of the proxy source code. Determining when a known error has been found may help to determine proper coverage of the proxy source code based on the conditions within the source code. When a known error is not found, the conditions in the proxy functions of the proxy source code may be constraining the coverage of the proxy source code so that fewer paths within the proxy source code are analyzed than desired. When fewer paths are being analyzed than desired, the proxy source code may be generalized to broaden the coverage of the proxy source code. When a known error has been found, the method 500 may end. When a known error has not been found, the method 500 may proceed to block 514.

In block 514, the proxy source code may be generalized by generalizing proxy functions in the proxy source code. A proxy function may be generalized as indicated previously. Block 514 may be followed by block 504 where the generalized proxy source code may be reanalyzed and the method 500 may continue.

Figure 6:
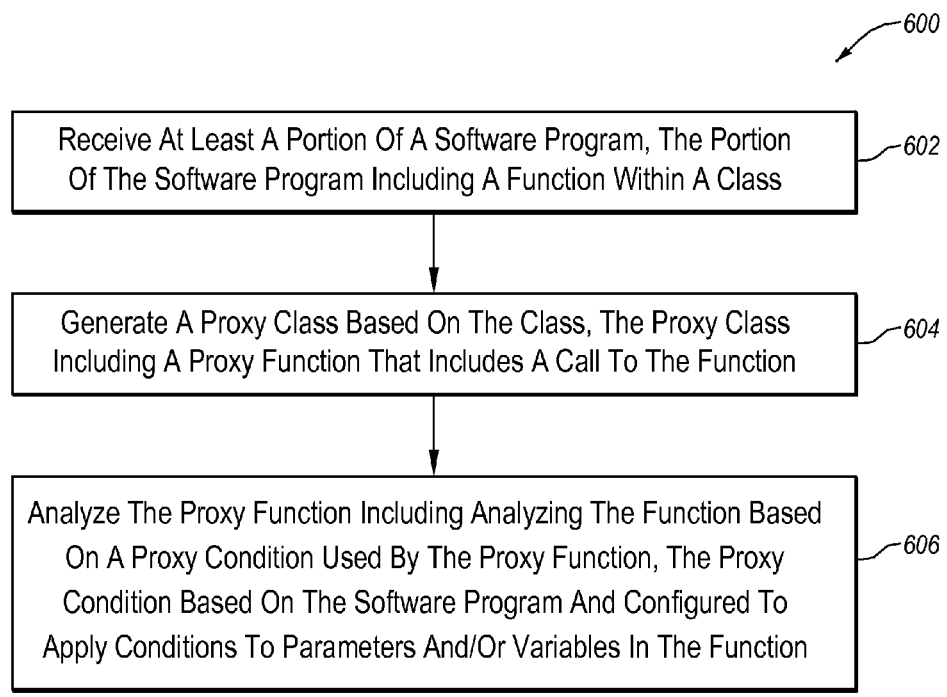

FIG. 6 is a flow chart of another example method 600 of verifying software, arranged in accordance with at least some embodiments described herein. The method 600 may be implemented, in some embodiments, by a verifying system, such as the system 200 for verifying software of FIG. 2. Although illustrated as discrete blocks, various blocks may be divided into additional blocks, combined into fewer blocks, or eliminated, depending on the desired implementation.

The method 600 may begin at block 602, where at least a portion of a software program may be received. The portion of the software program may include a software function within a class.

In block 604, a proxy class may be generated based on the class. The proxy class may include a proxy function that includes a call to the software function.

In block 606, the proxy function may be analyzed. The analysis of the proxy function may include analyzing the software function based on a proxy condition used by the proxy function. The proxy condition may be based on the software program and may be configured to apply conditions to parameters and/or variables in the software function. In some embodiments, the proxy condition may be used by the proxy function as a proxy parameter of the proxy function or as a variable defined within the proxy function.

In some embodiments, the proxy function may be analyzed using static software analysis, dynamic software analysis, or symbolic analysis. In some embodiments, the proxy condition may be generated or may be received from a user.

In some embodiments, the analysis of the proxy function may result in analysis of selected behavior of the software function, the behavior of the software function selected for analysis may be based on the proxy condition limiting potential execution paths of the software function. In these and other embodiments, the method 600 may further include determining a test case for verifying the selected behavior of the software function based on the analysis of the selected behavior.

In some embodiments, the proxy condition may be used as a parameter in the proxy function and may be based on a variable from the software function where the variable determines a control flow of the software function. In these and other embodiments, the method 600 may further include determining a coverage of the selected behavior of the software function. The coverage of the selected behavior of the software function may be based on a number of lines or branches of the software function analyzed. When the coverage of the selected behavior of the software function is less than a threshold, the method 600 may further include reanalyzing the proxy function. The reanalysis of the proxy function may result in analysis of selected second behavior of the software function. The second behavior of the software function may be selected for analysis based on a second proxy condition that constrains a value of the variable from the software function.

In some embodiments, the proxy condition may be used as a variable in the proxy function and assigned a value associated with a previous execution of the software function. In these and other embodiments, the method 600 may further include determining a coverage of the selected behavior of the software function. The coverage of the selected behavior of the software function may be based on a number of lines or branches of the software function analyzed. When the coverage of the selected behavior of the software function is less than a threshold, the method 600 may further include reanalyzing the proxy function. The reanalysis of the proxy function may result in analysis of selected second behavior of the software function. The second behavior of the software function selected for analysis may be based on a second proxy condition that includes a parameter in the proxy function that is based on the variable.

In some embodiments, the proxy condition may be configured to include conditions from the software program that affect a determination of errors determined in the software function based on the analysis of the software function. In these and other embodiments, when a known error is not determined, the method 600 may further include reanalyzing the proxy function. The reanalysis of the proxy function may be based on a second proxy condition.

Figure 7:
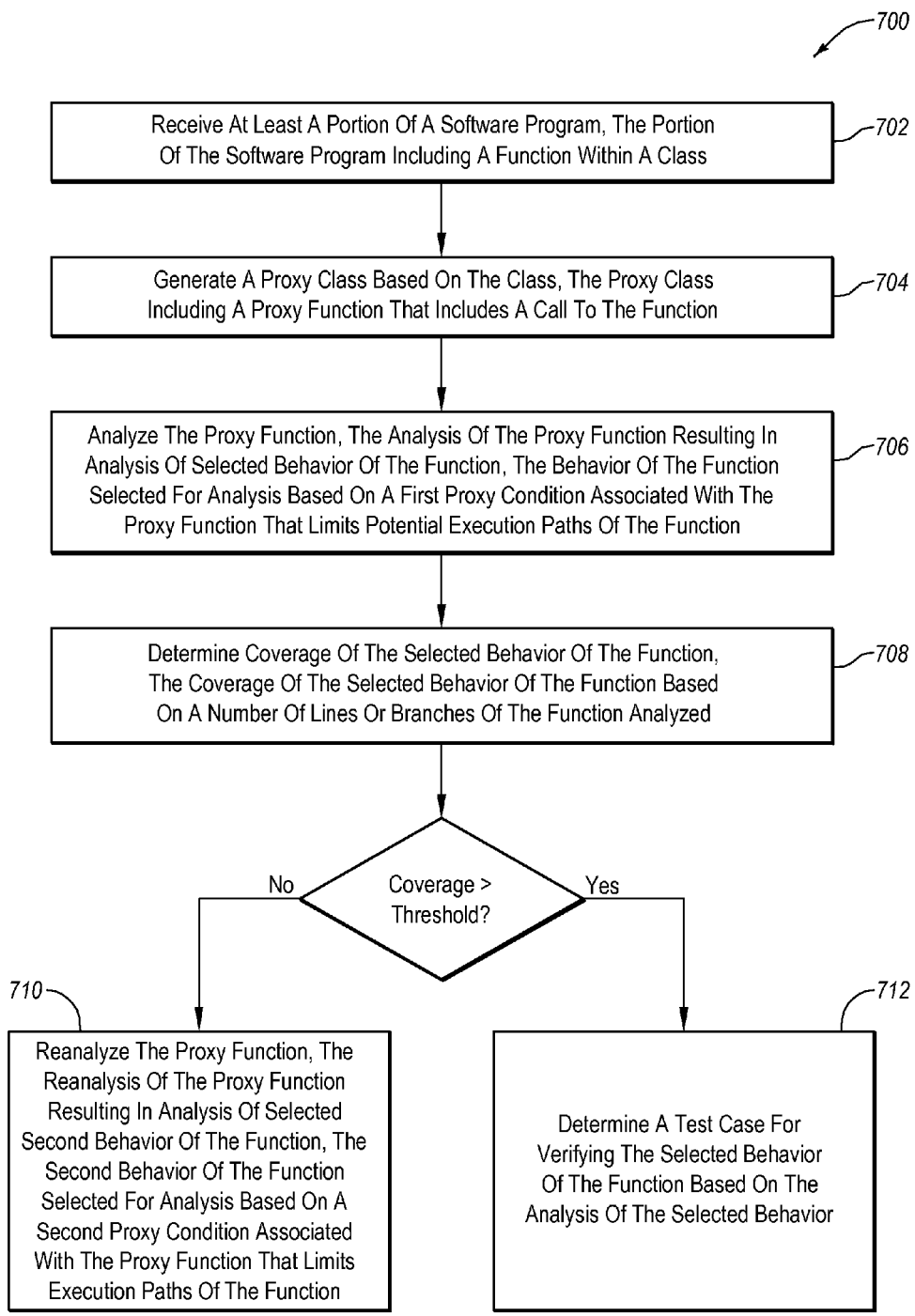

FIG. 7 is a flow chart of an example method 700 of verifying software, arranged in accordance with at least some embodiments described herein. The method 700 may be implemented, in some embodiments, by a verifying system, such as the system 200 for verifying software of FIG. 2. Although illustrated as discrete blocks, various blocks may be divided into additional blocks, combined into fewer blocks, or eliminated, depending on the desired implementation.

The method 700 may begin at block 702, where at least a portion of a software program may be received. The portion of the software program may include a software function within a class.

In block 704, a proxy class may be generated based on the class. The proxy class may include a proxy function that includes a call to the software function.

In block 706, the proxy function may be analyzed. The analysis of the proxy function may result in analysis of selected behavior of the software function. In some embodiments, the behavior of the software function selected for analysis may be based on a first proxy condition associated with the proxy function that may limit potential execution paths of the software function.

In block 708, coverage of the selected behavior of the software function may be determined. The coverage of the selected behavior of the software function may be based on a number of lines or branches of the software function analyzed. When the coverage of the selected behavior of the software function is less than a threshold, the method 700 may proceed at block 710. When the coverage of the selected behavior of the software function is greater than a threshold, the method 700 may proceed at block 712.

In block 710, the proxy function may be reanalyzed. The reanalysis of the proxy function may result in analysis of selected second behavior of the software function. The second behavior of the software function may be selected for analysis based on a second proxy condition associated with the proxy function that limits execution paths of the software function. In some embodiments, the proxy function may be analyzed and reanalyzed using static software analysis, dynamic software analysis, or symbolic analysis.

In some embodiments, the first proxy condition may be based on a proxy parameter of the proxy function and the second proxy condition may be based on a proxy variable defined within the proxy function associated with the proxy parameter. Alternately or additionally, the first proxy condition may be based on a proxy variable defined within the proxy function and the second proxy condition may be based on a proxy parameter of the proxy function associated with the proxy variable.

In block 712, a test case for verifying the selected behavior of the software function may be determined based on the analysis of the selected behavior.

The embodiments described herein may include the use of a special purpose or general-purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may comprise tangible computer-readable storage media including RAM, ROM, EEPROM, CD-ROM or other optical disk storage, magnetic disk storage or other magnetic storage devices, or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" may refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of verifying software, the method comprising:
receiving at least a portion of a software program, the portion of the software program including a software function within a class;
generating a proxy class based on the class, the proxy class including a proxy function that includes a call to the software function and a proxy condition within the proxy function that operates as a parameter in the proxy function, the proxy condition based on a software function variable from the software function that determines a control flow of the software function and is configured to apply conditions to parameters and/or variables in the software function;
analyzing the proxy function, the analysis of the proxy function resulting in analysis of selected behavior of the software function, the behavior of the software function selected for analysis based on the proxy condition limiting potential execution paths of the software function;
determining a test case for verifying the selected behavior of the software function based on the analysis of the selected behavior; and
when errors, which include errors due to: lack of computing resources, timing out of a process, non-identification of previously known errors an inability to handle the proxy function or errors identified at a function level in the software program as false positive errors when considered in view of the software program, are encountered while generating test cases corresponding to the proxy class and proxy functions, constraining or generalizing the proxy function.

2. The method of claim 1, wherein the proxy condition is used by the proxy function as a proxy parameter of the proxy function or as a variable defined within the proxy function.

3. The method of claim 1, wherein the proxy function is analyzed using static software analysis, dynamic software analysis, or symbolic analysis.

4. The method of claim 1, wherein the proxy condition is generated or is received from a user.

5. The method of claim 1, the method further comprising:
determining a coverage of the selected behavior of the software function, the coverage of the selected behavior of the software function based on a number of lines or branches of the software function analyzed; and
when the coverage of the selected behavior of the software function is less than a threshold, reanalyzing the proxy function, the reanalysis of the proxy function resulting in analysis of selected second behavior of the software function, the second behavior of the software function selected for analysis based on a second proxy condition that constrains a value of the variable from the software function.

6. The method of claim 1, wherein the proxy condition is used as a variable in the proxy function and assigned a value associated with a previous execution of the software function.

7. The method of claim 6, further comprising
determining a coverage of the selected behavior of the function, the coverage of the selected behavior of the software function based on a number of lines or branches of the software function analyzed; and
when the coverage of the selected behavior of the software function is less than a threshold, reanalyzing the proxy function, the reanalysis of the proxy function resulting in analysis of selected second behavior of the function, the second behavior of the software function selected for analysis based on a second proxy condition that includes the parameter in the proxy function that is based on the variable.

8. The method of claim 1, wherein the proxy condition is configured to include conditions from the software program that affect a determination of errors determined in the software function based on the analysis of the software function.

9. A processor configured to execute computer instructions from a computer readable medium to cause a system to perform operations to verify software, the operations comprising:
receiving at least a portion of a software program, the portion of the software program including a software function within a class;
generating a proxy class based on the class, the proxy class including a proxy function that includes a call to the software function and a proxy condition within the proxy function that operates as a parameter in the proxy function, the proxy condition based on a software function variable from the software function that determines a control flow of the software function and is configured to apply conditions to parameters and/or variables in the software function;
analyzing the proxy function, the analysis of the proxy function resulting in analysis of selected behavior of the software function, the behavior of the software function selected for analysis based on the proxy condition limiting potential execution paths of the software function;
determining a test case for verifying the selected behavior of the software function based on the analysis of the selected behavior; and
when errors, which include errors due to: lack of computing resources, timing out of a process, non-identification of previously known errors, an inability to handle the proxy function, or errors identified at a function level in the software program as false positive errors when considered in view of the software program, are encountered while generating test cases corresponding to the proxy class and proxy functions, constraining or generalizing the proxy function.

10. The processor of claim 9, wherein the proxy condition is used by the proxy function as a proxy parameter of the proxy function or as a variable defined within the proxy function.

11. The processor of claim 9, wherein the proxy function is analyzed using static software analysis, dynamic software analysis, or symbolic analysis.

12. A method of verifying software, the method comprising:
receiving at least a portion of a software program, the portion of the software program including a software function within a class;
generating a proxy class based on the class, the proxy class including a proxy function that includes a call to the software function;
analyzing the proxy function, the analysis of the proxy function resulting in analysis of selected behavior of the software function, the behavior of the software function selected for analysis based on a first proxy condition associated with the proxy function that limits execution paths of the software function;
determining coverage of the selected behavior of the software function, the coverage of the selected behavior of the software function based on a number of lines or branches of the software function analyzed;

when the coverage of the selected behavior of the software function is less than a threshold, reanalyzing the proxy function, the reanalysis of the proxy function resulting in analysis of selected second behavior of the software function, the second behavior of the software function selected for analysis based on a second proxy condition associated with the proxy function that limits execution paths of the software function;

when the coverage of the selected behavior of the software function is greater than the threshold, determining a test case for verifying the selected behavior of the software function based on the analysis of the selected behavior; and when errors, which include errors due to: lack of computing resources, timing out of a process, non-identification of previously known errors an inability to handle the proxy function, or errors identified at a function level in the software program as false positive errors when considered in view of the software program, are encountered while generating test cases corresponding to the proxy class and proxy functions, constraining or generalizing the proxy function.

13. The method of claim 12, wherein the first proxy condition is based on a proxy parameter of the proxy function and the second proxy condition is based on a proxy variable defined within the proxy function associated with the proxy parameter.

14. The method of claim 12, wherein the first proxy condition is based on a proxy variable defined within the proxy function and the second proxy condition is based on a proxy parameter of the proxy function associated with the proxy variable.

* * * * *